United States Patent
Isler et al.

(10) Patent No.: US 9,947,243 B1
(45) Date of Patent: Apr. 17, 2018

(54) FALL-DIRECTION MANNEQUIN TRAINING SYSTEM WITH FALL-DIRECTION CONTROL AND/OR RANDOMIZATION

(71) Applicant: LOCKHEED MARTIN CORPORATION, Bethesda, MD (US)

(72) Inventors: Christopher T. Isler, Winter Park, FL (US); Peter J. Condon, Winter Springs, FL (US); Terry L. Hanna, Orlando, FL (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 263 days.

(21) Appl. No.: 14/799,643

(22) Filed: Jul. 15, 2015

(51) Int. Cl.
*A63B 69/34* (2006.01)
*A63B 69/00* (2006.01)
*G09B 23/30* (2006.01)
*G09B 9/00* (2006.01)

(52) U.S. Cl.
CPC .............. *G09B 23/30* (2013.01); *A63B 69/34* (2013.01); *G09B 9/003* (2013.01)

(58) Field of Classification Search
CPC ........ G09B 23/30; G09B 9/003; A63B 69/34; A63B 69/00; A63B 69/004; A63B 2069/004; A63B 2220/53; A63B 2220/58; F41J 7/00; B27L 7/00
USPC ............. 273/406, 391, 392, 407; 144/195.5; 70/10, 12, 106, 109, 110, 111, 186, 141, 70/162, 169, 173, 278.7, 494
See application file for complete search history.

(56) References Cited

U.S. PATENT DOCUMENTS

| 5,222,741 | A * | 6/1993 | Redl | F41J 7/04 273/393 |
| 6,033,349 | A * | 3/2000 | Farenholtz | A63B 69/004 482/83 |
| 7,694,973 | B1 * | 4/2010 | Hofmeister | F41J 7/06 273/391 |
| 7,735,832 | B2 | 6/2010 | Bliehall | |
| 2007/0105070 | A1 | 5/2007 | Trawick | |
| 2012/0074645 | A1 | 3/2012 | Hodge | |
| 2016/0327378 | A1 * | 11/2016 | Davis | F41J 5/205 |

* cited by examiner

*Primary Examiner* — Sam Yao
*Assistant Examiner* — Lily M Del Valle
(74) *Attorney, Agent, or Firm* — Terry M. Sanks, Esq.; Beusse Wolter Sanks & Maire, PLLC

(57) ABSTRACT

A system comprising a mannequin and a plurality of sensors coupled to the mannequin configured to generate at least one sensed signal. The system includes first and second latching mechanisms independently controlled, each of the first and second latching mechanisms having a latched state and an unlatched state; and first and second pins providing an axis of rotation, the first pin releasably coupled to the first latching mechanism and the second pin releasably coupled to the second latching mechanism. A computing device is coupled to the plurality of sensors and first and second latching mechanisms via communication interfaces. The computing device selects a fall-direction from a plurality of different fall-direction options based on at least one sensed signal and causes the unlatching of the first latching mechanism to release the first pin or the second latching mechanism to release the second pin based on the selected fall-direction.

19 Claims, 10 Drawing Sheets

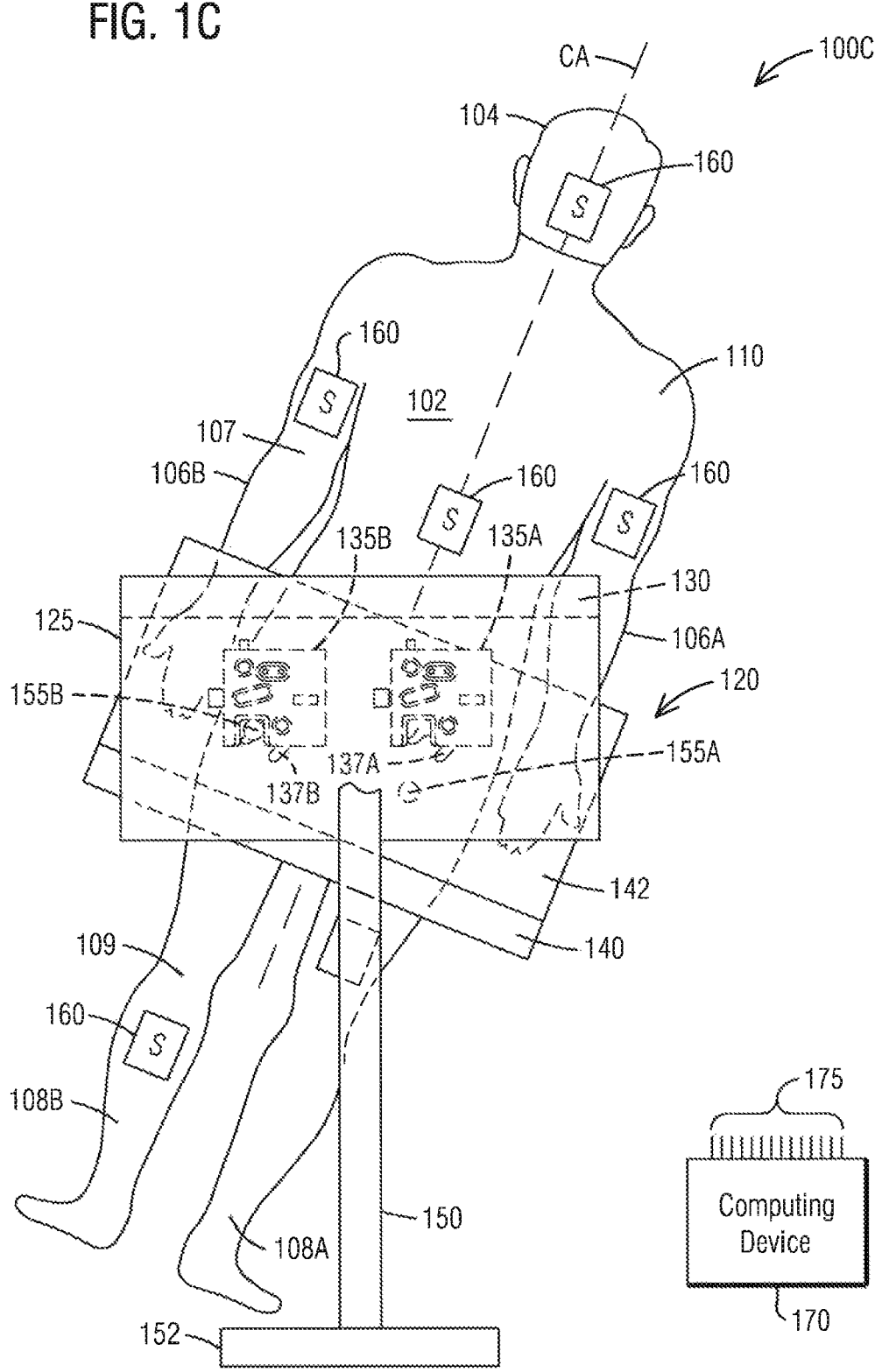

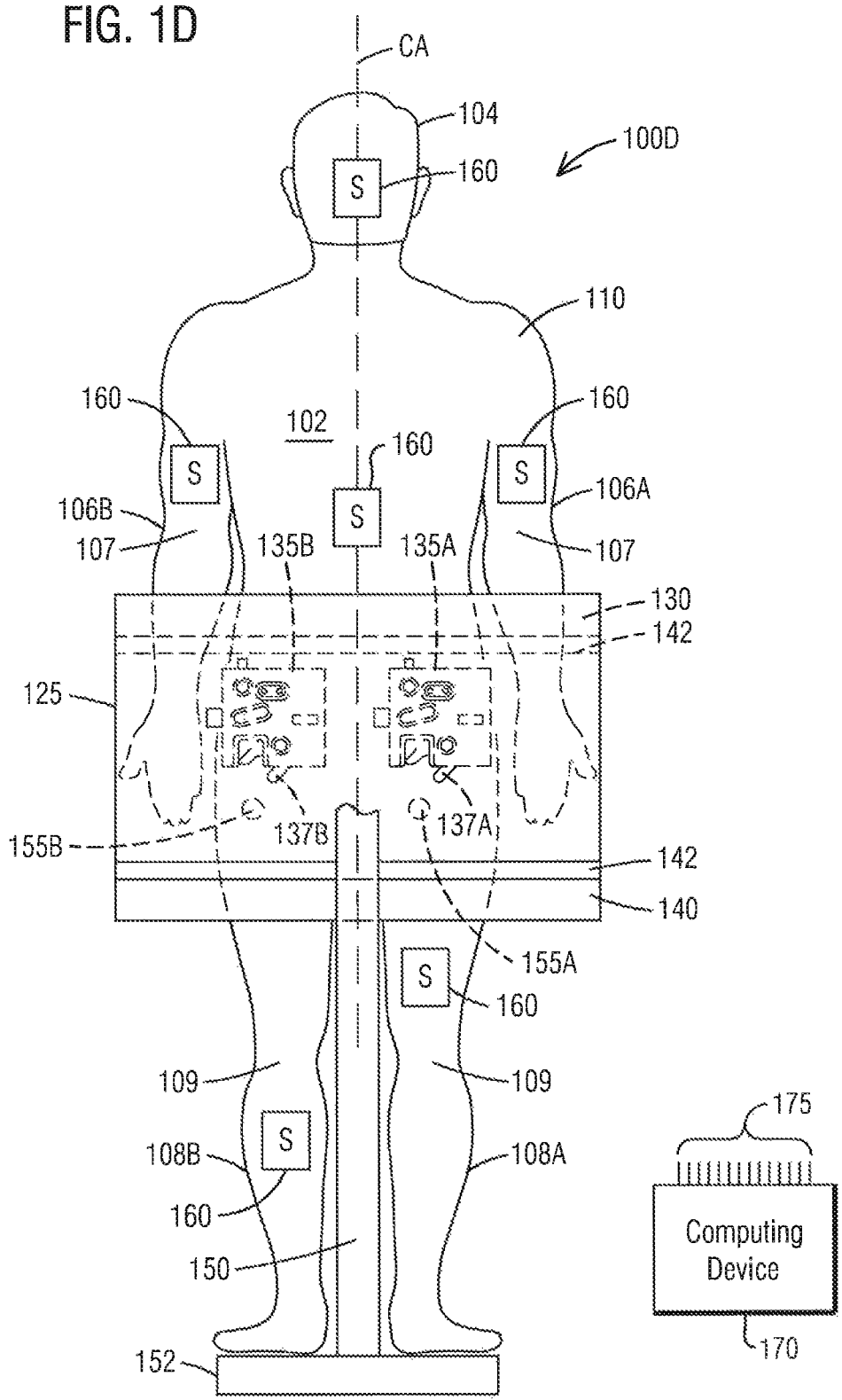

FALL-DIRECTION MANNEQUIN TRAINING SYSTEM WITH FALL-DIRECTION CONTROL AND/OR RANDOMIZATION

BACKGROUND

Embodiments relate to mannequin training systems, and specifically, to a mannequin training system and method with fall-direction control and randomization.

Urban Operations Training System (UOTS)-style programs had been delivering General Dynamics Information Technology (GDIT)-made human type targets that generally only collapsed forward or backwards upon being shot with a live round. When the target collapses forward, it has the potential of hitting the shooter's weapon and causing a misfire in close quarters. If it falls backwards, it is often against a wall and may not appear "collapsed." To change from forward falling to backwards falling requires significant effort to re-configure the target. The GDIT-made human type targets do not fall in a realistic manner.

Additionally, some of the existing targets use magnets to maintain the target in an upright position. However, when power is removed, the target will collapse unless it is manually secured upright.

SUMMARY

Embodiments relate to a mannequin training system and method with fall-direction control and randomization. An aspect of the embodiments include a system comprising: a mannequin and a plurality of sensors coupled to the mannequin configured to generate at least one sensed signal. The system includes first and second latching mechanisms independently controlled, each of the first and second latching mechanisms having a latched state and an unlatched state; and first and second pins providing an axis of rotation, the first pin being releasably coupled to the first latching mechanism and the second pin being releasably coupled to the second latching mechanism. A computing device may be coupled to the plurality of sensors and the first and second latching mechanisms via communication interfaces. The computing device selects a fall-direction from a plurality of different fall-direction options based on the at least one sensed signal and causes the unlatching of the first latching mechanism to release the first pin or the second latching mechanism to release the second pin based on the selected fall-direction of the plurality of different fall-direction options.

An aspect of the embodiments includes a system comprising a fall-direction control platform. The fall-direction control platform includes a first part comprising an upper member, a first latching mechanism coupled to the upper member on a first side; a second latching mechanism coupled to the upper member on a second side, the second side being horizontally aligned with the first side; an upright support member coupled to the upper member and a base coupled to the upright support member. The fall-direction control platform includes a second part comprising a second upper member, first and second latching pins coupled to the second upper member, the first and second latching pins being releasably coupleable to the first and second latching mechanism; and a mannequin interface configured to couple a mannequin to the second part. The fall-direction control platform includes communication interfaces to the first latching mechanism and the second latching mechanism, the communication interfaces to communicate control signals from a computing device to the first latching mechanism and the second latching mechanism based on a fall-direction sequence.

Another aspect of the embodiments include a method comprising sensing, by a plurality of sensors, a parameter associated with a hit to a mannequin; and selecting, by a computing device, a fall-direction sequence from a plurality of fall-direction sequences when a hit is sensed by at least one sensor. The method includes causing unlatching, by the computing device, of a first latching mechanism to release a first pin to cause the mannequin to begin to fall under gravitational forces in a direction associated with the selected fall-direction sequence; and causing unlatching, by the computing device, of a second latching mechanism to release the second pin to cause a fall of the mannequin in the direction of the fall-direction sequence.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which:

FIG. 1C illustrates the fall-direction mannequin training system in a third state;

FIG. 1D illustrates the fall-direction mannequin training system in a fourth state;

DETAILED DESCRIPTION

Figure 1A:
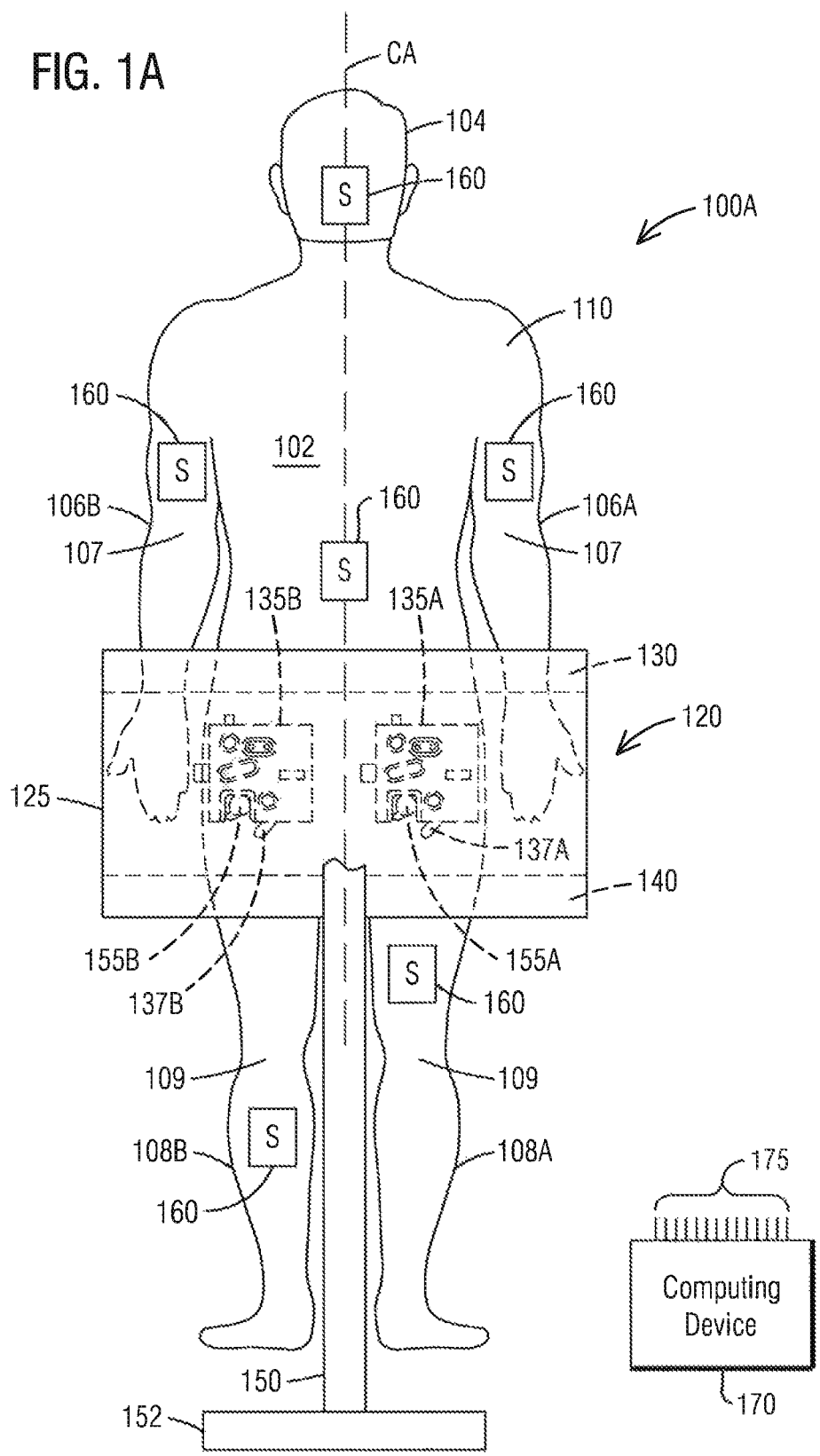
FIG. 1A illustrates a fall-direction mannequin training system in a first state.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein.

The embodiments are not limited by the illustrated ordering of acts or events, as some acts may occur in different orders and/or concurrently with other acts or events. Furthermore, not all illustrated acts or events are required to implement a methodology in accordance with the embodiments.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

FIG. 1A illustrates a fall-direction mannequin training system 100A in a first state. The first state of system 100A includes an upright state as will be described in more detail below. The system 100A may include a mannequin 110, a plurality of sensors (S) 160 and a fall control platform 120 configured to cause the mannequin 110 to rotate about a low torso area in a left direction (FIG. 1B), a right direction (FIG. 1C) or a forward direction (FIG. 1D) based on a sensed hit to the structure of the mannequin 110. In an embodiment, the direction may be based on the sensed hit and/or a direction elimination function. In an embodiment, the mannequin 110 may be a target. The system 100A may include a computing device 170 having communication lines 175 coupled, via communication interfaces, to the fall control platform 120 to control the operation of the fall control platform 120.

The mannequin 110 may include a plurality of body parts. The plurality of body parts may include a torso 102, a head 104, first and second arms 106A and 106B, and first and second legs 108A and 108B. The mannequin 110 may include other parts not disclosed herein for the sake of brevity. In an embodiment, each limb, first and second arms 106A and 106B and the first and second legs 108A and 108B may be rotatably coupled to the torso 102 according to anatomical simulated joint structures. In an embodiment, first and second arms 106A and 106B may each include a hinged elbow joint 107. In an embodiment, the first and second legs 108A and 108B may include rotatable knee joints 109.

The mannequin 110 may include, for example, one or more of a neck, ears, eyes, nose, mouth, chin, shoulders, hand, fingers, feet, toes, ankles, calf, thigh, groin, and abdomen. The top of the thigh may be rotatably coupled to the lower torso section 105. The upper arms may be rotatably coupled to the shoulders (see FIG. 6). In an embodiment, the mannequin 110 has a center of mass, denoted by the dashed line CA, which extends vertically along a center of the torso 102 and head 104. The center of mass CA may extend along the mannequin 110 which is essentially in between the legs 108A and 108B. In an embodiment, the mannequin may have an anatomical structure of an animal, alien, and other structures that need to fall.

Figure 2:
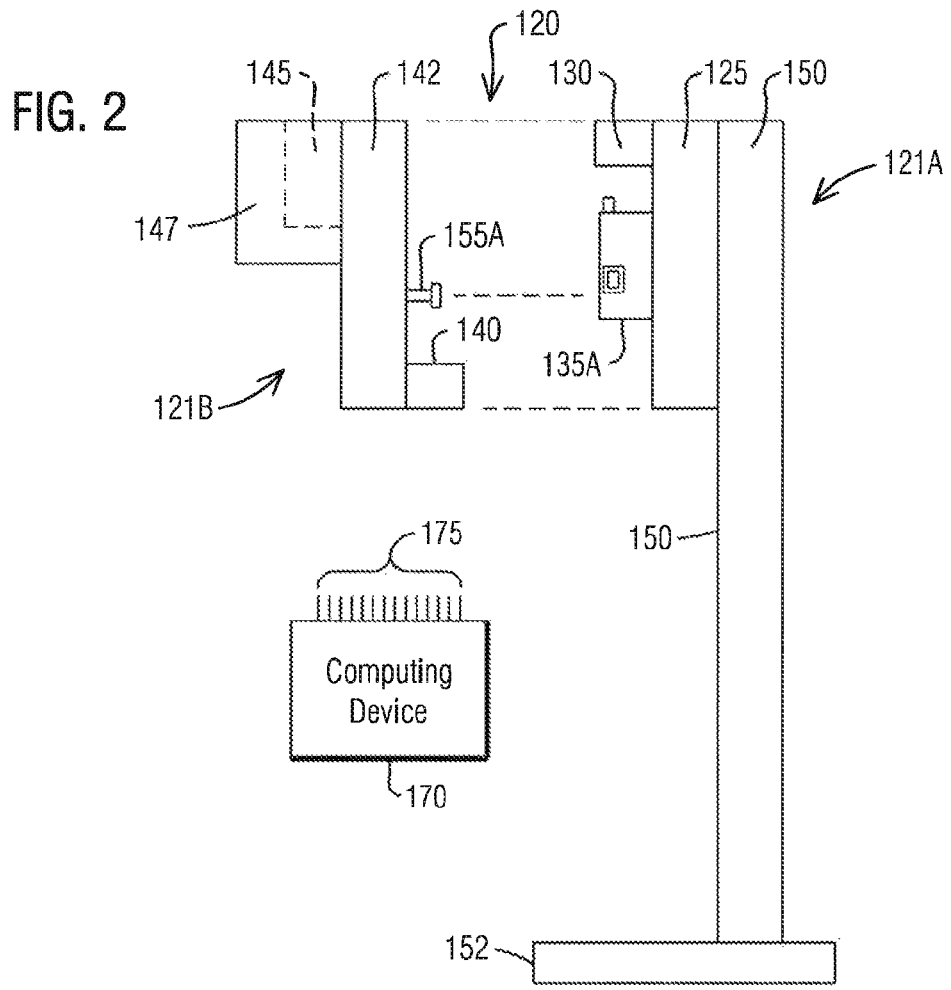
FIG. 2 illustrates a fall-direction control platform.
Figure 3:
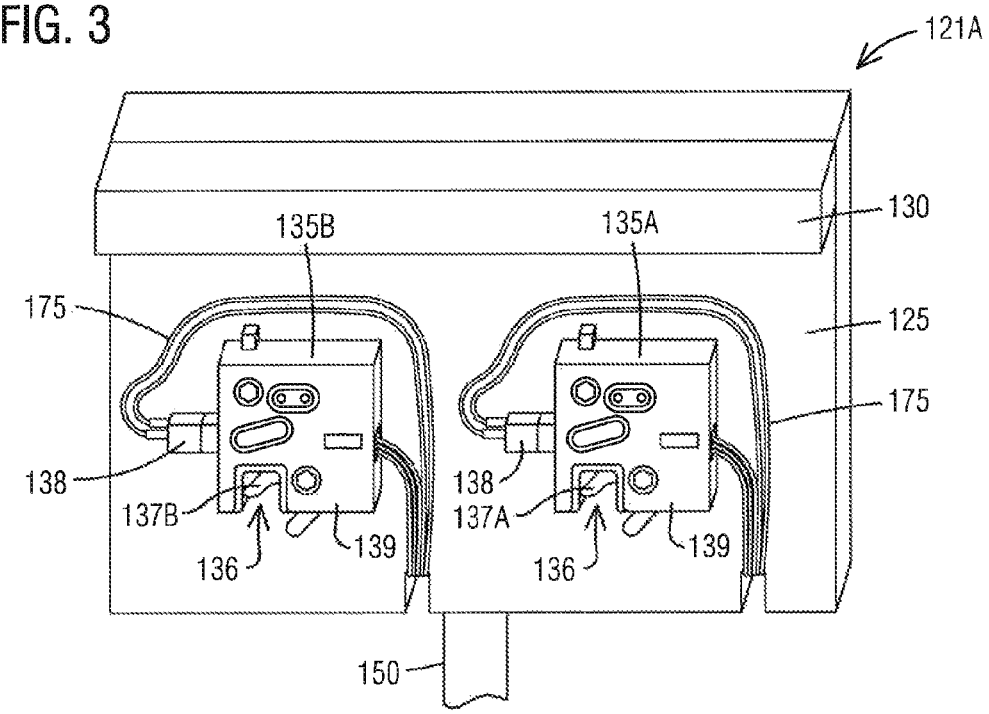
FIG. 3 illustrates a first part of the fall-direction control platform.
Figure 4:
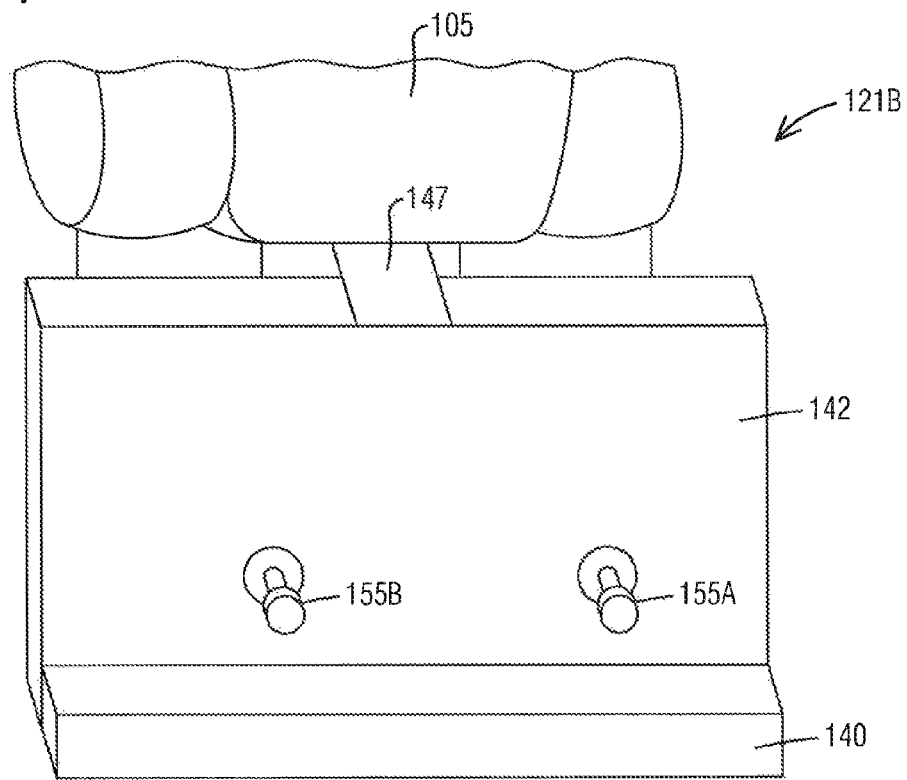
FIG. 4 illustrates a second part of the fall-direction control platform.

Referring also to FIG. 2, the fall-direction control platform 120 is illustrated. FIG. 2 will also be described in relation to FIG. 3 illustrating a first part 121A of the fall-direction control platform 120 and FIG. 4 illustrating a second part 121B of the fall-direction control platform 120. The first part 121A of the fall-direction control platform 120 may include an upright support member 150 supported on a support base 152. The control platform 120 further includes first and second upper members 125 of the first part 121A and 142 of the second part 121B both of which may be parallel or aligned with each other. The first upper member 125 may include a spacer bar member 130. The second upper member 142 may include a spacer bar member 140.

The first upper member 125 may be coupled to the upright support member 150 such as along a first side of the upright support member 150. On the other hand, the spacer bar member 130 may be coupled to a second side of the upright support member 150 wherein the first side and the second side are parallel sides and/or opposite each other. In FIG. 1A, the upright support member 150 is shown partially removed over the area of the upright support member 150.

The first upper member 125 of the first part 121A may have mounted there to at least one latching device or mechanism 135A and 135B. In an embodiment, the first upper member 125 is elevated above ground such that the at least one latching device or mechanism 135A is located in an area around the lower torso area of the mannequin 110 or leg area. The lower torso area being related to a low back area or buttock area anatomically. In an embodiment, there may be two latching devices or mechanisms 135A and 135B wherein the two latching devices or mechanisms 135A and 135B are each located in a separate buttock or lower back area of the torso. As shown in FIG. 1A, the latching device or mechanism 135A is on one side of the center of mass CA while the latching device or mechanism 135B is on an opposite side of the center of mass CA. In an embodiment, the two latching devices or mechanisms 135A and 135B may be horizontally aligned but offset about the center of mass CA. Alternately, the two latching devices or mechanisms 135A and 135B may be vertically aligned. By way of non-limiting example, the vertical alignment may be used for mannequins in a sitting position, such as on a chair or other support surface. In an embodiment, the pins and latching devices or mechanism may be moved lower on the mannequin such as without limitation, on the upper leg area and knee area.

Referring now to FIG. 4, since the latching devices or mechanisms 135A and 135B are essentially identical, only one such latching device or mechanism will be described in detail. The device 135B may include a switch (SW) 138 and latch 137B. The switch 138 may be coupled to or housed in a latch housing 139. The housing 139 may include a slot 136. The slot 139 may be configured to receive a respective one latching pin 155B. In an embodiment, the slot 136 may be opened along a bottom side of housing 139. By way of non-limiting example, the pin (i.e., latching pin 155B) is moved upward into the slot 136 and latched in place with latch 137B. When, the pin (i.e., latching pin 155B) is released, the pin may be configured to slide downward out of the slot 136 under the force of gravity.

The switch 138 may have communication lines 175 coupled thereto via communication interfaces. The communication lines 175 may be communication lines from the computing device 170 to the switch 138. Switch 138 may be a limit switch which monitors a latch state. This info (latch state) may be transferred back to the processor/microcontroller 575 for status. The limit switch may be mechanically set when the mannequin is reset onto the pins 155A and 155B.

The second upper member 142 of the second part 121B may include a support member 145. The support member 145 may support a mannequin interface 147. The center of mass CA may extend along the mannequin interface 147 such that the interface 147 may be centered along the longitudinal axis of the torso 102.

In an embodiment, the support member 145 and the mannequin interface 147 may be coupled to the second upper member 142 on a first side. The first side of the second upper member 142 being oriented and configured to be adjacent to the mannequin 110.

In an embodiment, the mannequin interface 147 may be configured to be attached directly to or mounted under the lower torso section (i.e., section 605 of FIG. 6) of the torso 102 of the mannequin 110. The second side of the second upper member 142 may have at least one latching pin 155A and 155B, as best seen in FIG. 4, securely fastened to the second side. When both latching pins 155A and 155B are latched, the mannequin 110 is in an upright configuration. Even if there were no power, the latching pins 155A and 155B may be configured to remain latched once latched. Hence, the mannequin remains upright.

The latching pins 155A and 155B may provide an axis of rotation for the fall-direction, as will be described in more detail later. In an embodiment, the weight of the second upper member 142 may be evenly distributed or balanced.

The freely rotating joints 107 and 109 move freely under the forces exerted on the mannequin 110 by the fall motion. This may assist in providing a more realistic anatomical falling simulation.

The plurality of sensors (S) 160 may include a piezoelectric sensor or shock sensor. By way of non-limiting, the computing device 170 includes a hit detector 768. When determining if a hit occurred, by the hit detector 768, a shock pattern or vibration rate from at least one of the sensors 160 may be determined. When determining which sensor sent the signal representative of a hit, a frequency of the signal may be sensed. In an embodiment, the frequency may differentiate one sensor or sensor zone from another. For example, those sensors in the kill zone may use the same frequency. However, the sensors in the kill zone may be different. The kill zone may be a mortal zone or lethal zone.

The frequency of the sensors in the non-lethal zone may be the same for all sensors. In an embodiment, the frequency of the sensors in the non-lethal zone may be varied from one sensor to the next. For example, sensors in the arms may include a different frequency than the sensors on the legs. The non-lethal zone may be a non-mortal zone or a non-kill zone.

The impact or hit of ammunition or projectile on the mannequin 110 translates into a vibration rate. The signal from a particular sensor 160 producing the largest vibration rate may be used to identify the zone of impact in combination with the frequency. Additionally, when determining a hit, the vibration rate may be compared to a predetermined vibration rate limit. The predetermined limit may allow the computing device 170 to ignore low level amplitudes which are determined to be below the predetermined limit. By way of non-limiting example, the low level amplitudes may be caused by the wind and foreign body impacts (i.e., rocks and leaves). The computing device 170 may not cause the mannequin 110 to fall based on low level amplitudes. The low level amplitudes may rule out touching the mannequin and/or bumping into, striking or colliding with the mannequin.

The computing device 170 may be configured to determine amplitudes which are a function of the ammunition being used. For example, paintballs may have a different vibration rate than a 5.56 mm live round. As can be appreciated, there are multiple types of ammunition. In an embodiment, the system 100A may be configured for live training using live ammunition. Hence, the system 100A may allow the predetermined limit to be varied based on the ammunition. In an embodiment, the predetermined limit may be set to prevent false positive hits.

In an embodiment, the plurality of sensors (S) 160 may include laser sensors (or receivers) configured for Multiple Integrated Laser Engagement System (MILES) operation or OSAG (Optische Schnittstelle fur AGDUS und GefUbZH) which is a European-type laser tag Standard. The laser sensors may sometimes be referred to as MILES-enabled sensors. The computing device 170 may cause the mannequin 110 to fall in a direction based on at least one sensor receiving a laser signal (illumination) from a MILES-enabled firearm. The computing device 170 may interface or be integrated with MILES decoding capability to decode the signals from the MILES-enabled sensors. In an embodiment, the MILES-enable sensors may be attached to the mannequin 110 using hook and loop fastening system, such as by Velcro®. The MILES decoding functionality may be integrated in the computing device 170.

Figure 5:
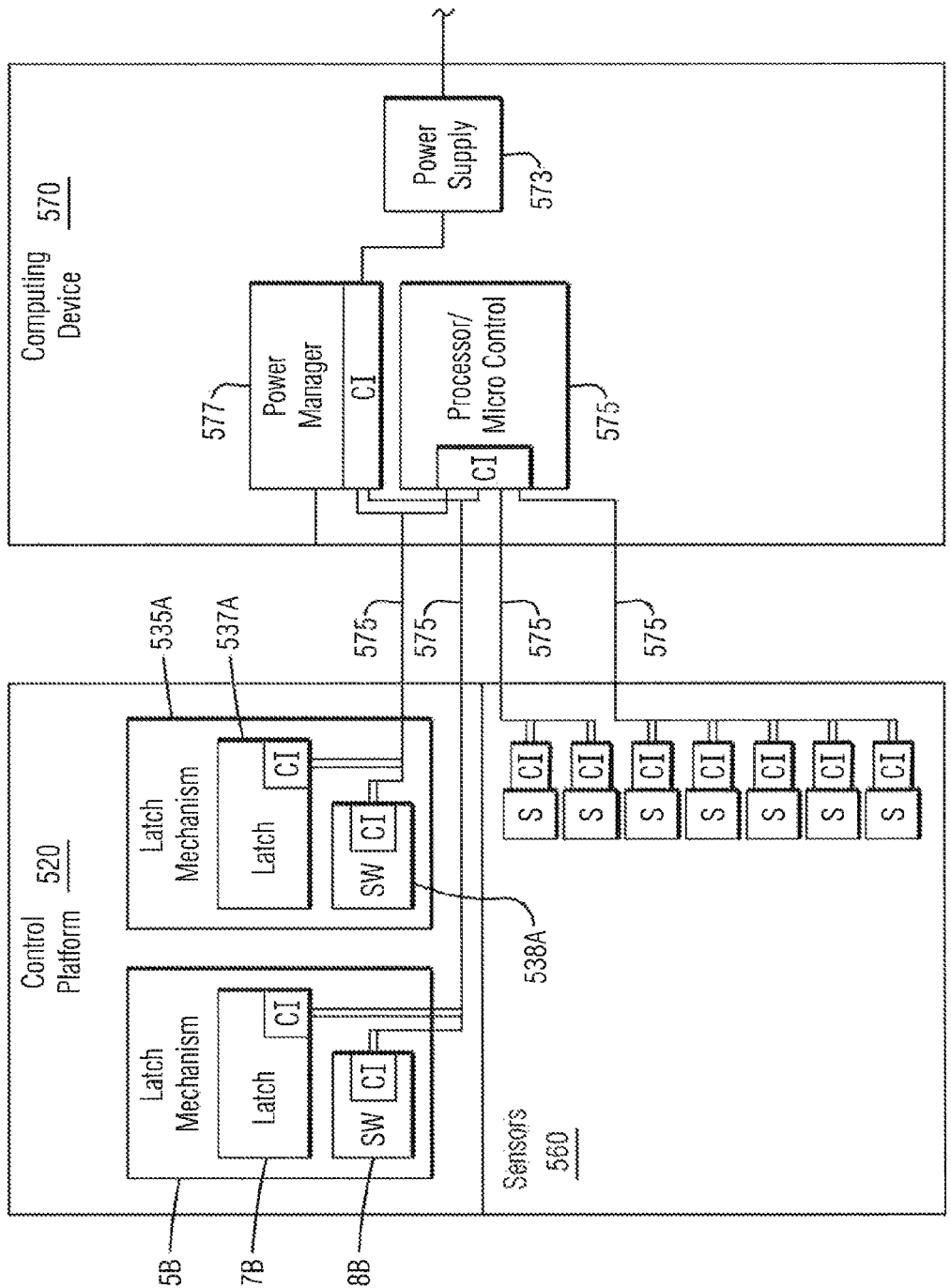
FIG. 5 illustrates schematic diagram of the electronics of the fall-direction control platform.

FIG. 5 illustrates schematic diagram of the electronics of the fall-direction control platform 520. The computing device 570 may include communication interfaces (CI) to interface with communication lines 575 associated with the plurality of sensors 560 such as, without limitation, shock sensors or MILES-enabled sensors and communication lines 575 associated with the switches (SW) 538A and 538B of the control platform 520 and latches 537A and 537B. The plurality of sensors 560 or MILES-enabled sensors may be distributed into zones. For example, a first zone may include a kill zone or lethal zone. The kill zone may include the head and upper torso. A second zone may include an arm zone. A third zone may include a leg zone. Alternately, the arm and leg may be assigned the same zone such as a non-lethal zone. Depending on the zone, the computing device 570 may alter the fall-direction sequence. For example, a hit to the kill zone may cause the mannequin to fall in a forward direction. However, a hit to the kill zone may cause the mannequin to fall to the left or the right based on random selection.

The computing device 570 includes a power manager 577 and a microcontroller or processor 575. The computing device 570 may include a power supply 573 which receives power from a power source such as a battery or an electrical outlet. The battery may be rechargeable. The power manager 577 may supply power to the latches 535A and 537B and the switches (SW) 538A and 538B.

The computing device 570 may receive at least one sensed signal from at least one of the plurality of sensors (S) 560. By way of non-limiting example, upon receiving at least one sensed signal from at least one sensor 560, the computing device 570 may first determine if a hit has occurred. The process for determining whether a hit has occurred is a function of the ammunition. For example, for live ammunition, an impact amplitude may be used. For MILES laser operations, a MILES decoder may determine which sensor received the laser signal. The system 100A may be configured to determine whether a hit occurred for laser tag systems, paintball system, simulated ammunition or live ammunition.

If a hit occurred, the computing device 570 may determine which particular sensor (S) sent the signal. The computing device 770 may determine a zone or location of the sensor communicating the at least one sensed signal. Based on the determined zone or location, a fall-direction is determined from the fall-direction options, such as a left fall-direction, right fall-direction or forward fall-direction.

In an embodiment, the fall-direction may be selected randomly from a list of available fall-direction options.

By way of non-limiting example, based on where the target (mannequin 110) may be located, a fall-direction may be excluded from the fall options. For example, if a target has a wall directly to the right, the computing device 170 may be configured to eliminate right fall-direction. On the other hand, if the target is adjacent to a wall on the left, the computing device 170 may eliminate, the left fall-direction. In an embodiment, if the target is placed behind a structure, the forward fall-direction may be eliminated.

Figure 1B:
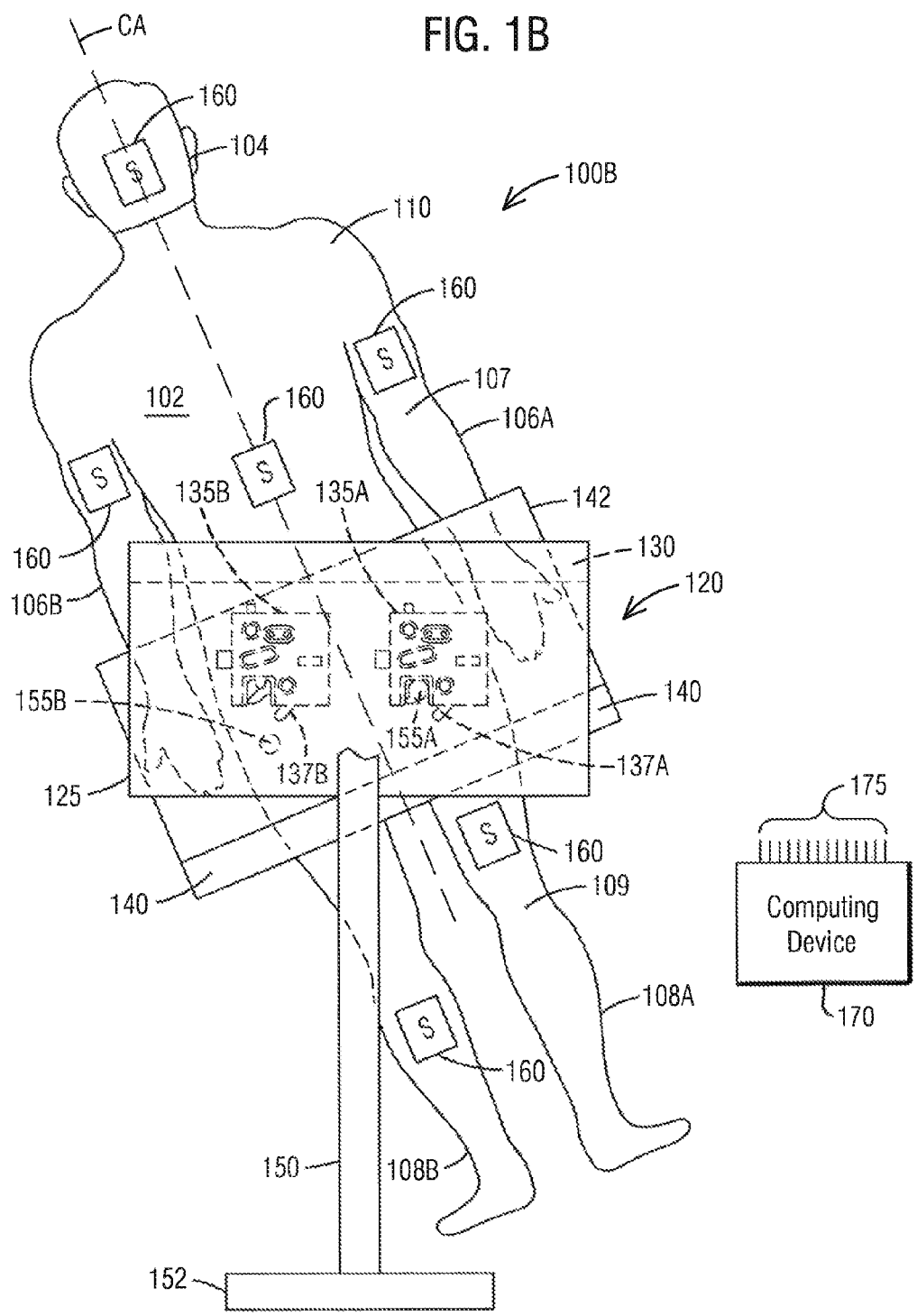
FIG. 1B illustrates the fall-direction mannequin training system in a second state.

Based on the selection, the computing device 570 may send control signals via communication interfaces (CI) to the control platform 520 to release at least one of the latches 137A or 137B of the latching device or mechanism 535A or 535B thereby releasing a corresponding latching pin 155A or 155B, as shown in FIGS. 1B, IC and 1D. Under the weight of the mannequin 110 and the second upper member 142, the mannequin rotates downward in the direction of the loosed latching pin for the left fall-direction or right fall-direction about the axis of rotation of the other latching pin held in a latched state. However, for a forward fall-direction, both latching pins 155A and 155B are released essentially simultaneously so that the mannequin 110 and second upper member 142 essentially fall downward. In an embodiment, as the mannequin 110 falls straight down, the mannequin 110 may fall forward.

Figure 6:
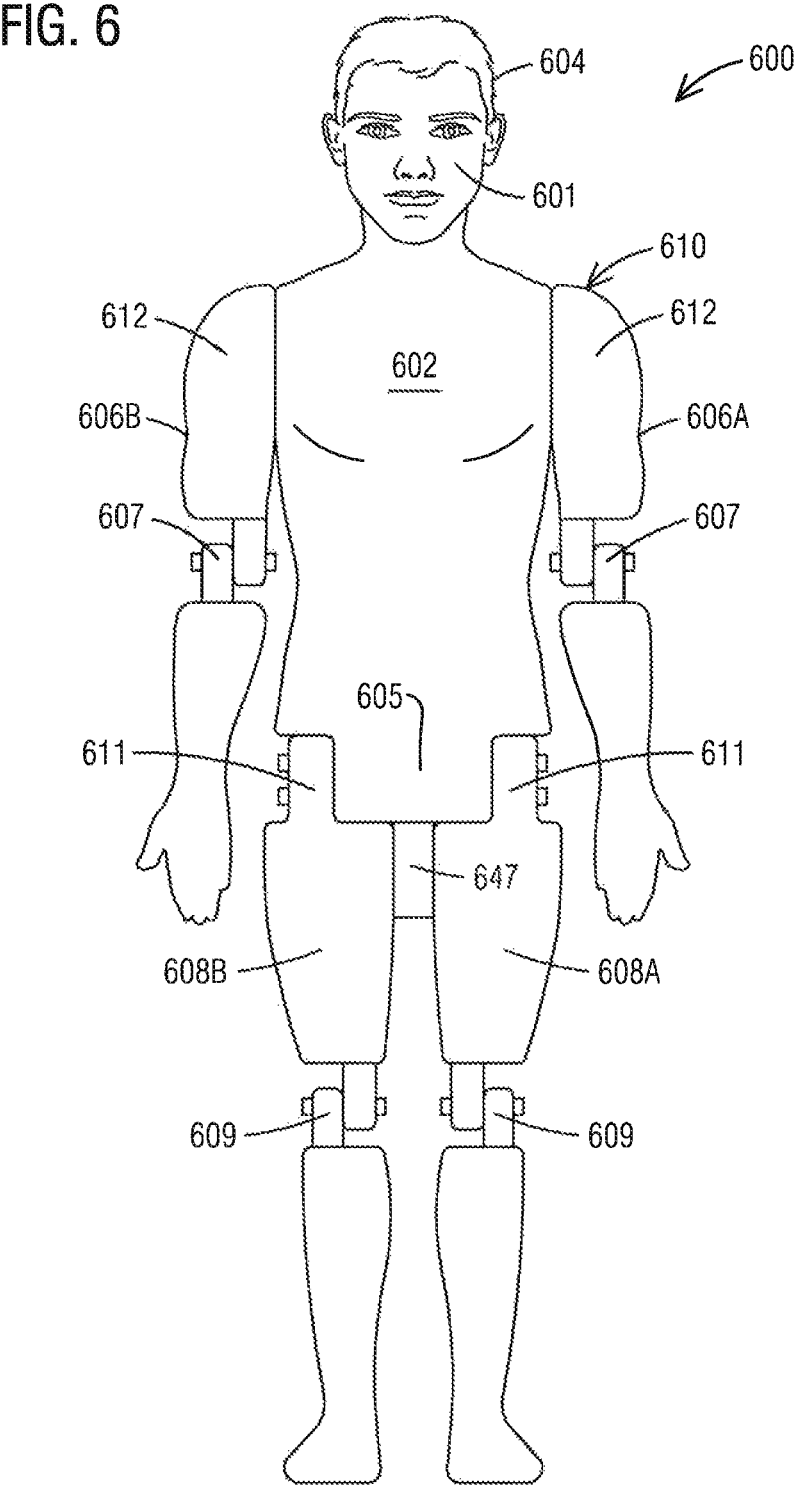
FIG. 6 illustrates a front view of a fall-direction mannequin training system.

FIG. 6 illustrates a front view of a fall-direction mannequin training system 600. The mannequin 610 may include a plurality of body parts. The plurality of body parts from a front view may include a torso 602, a head 604 with a face 601, first and second arms 606A and 606B, and first and second legs 608A and 608B. The mannequin 610 may include other parts not disclosed herein for the sake of brevity. In an embodiment, each limb, first and second arms 606A and 606B and the first and second legs 608A and 608B may be rotatably coupled to the torso 602 according to anatomical simulated joint structures. In an embodiment, first and second arms 606A and 606B may each include a hinged elbow joint 607. In an embodiment, the first and second legs 608A and 608B may include rotatable knee joints 609.

The face 601 may include, for example, one or more of eyes, nose, mouth, and chin. The top of the thigh may be rotatably coupled to the lower torso section 605 via hip joints 611. The upper arms 612 may be rotatably coupled to the shoulders. The mannequin interface 647 may be coupled to an underside of the lower torso section 605.

The processes of embodiments will now be described. The processes are described in blocks. The processes may be carried out in the order shown or one or more of the blocks may be added, omitted or performed contemporaneously with other blocks.

Figure 8A:
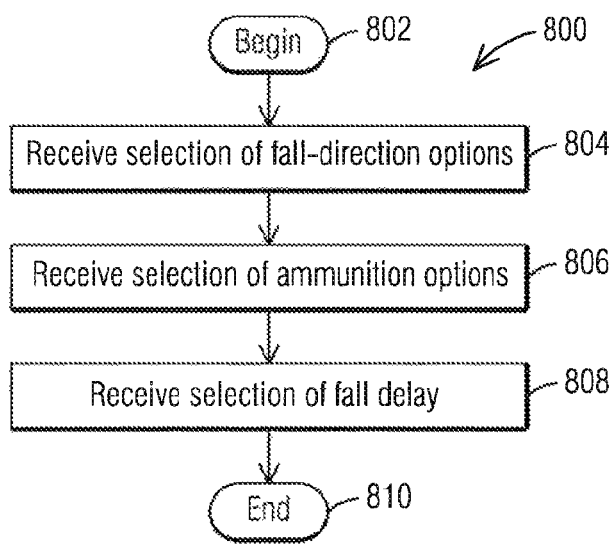
FIG. 8A illustrates a process for customizing the fall-direction of a target.

FIG. 8A illustrates a process 800 for customizing the fall-direction of a target (i.e., mannequin 110). The operation of system 100A may be varied. In an embodiment, the customizing process may begin at block 802. At block 804, the computing device may receive a selection of one or more fall-direction options. All options may be selected. However, right or left fall-direction options may be omitted if the mannequin 110 is positioned near a wall or other structures. Other structures may include trees, trucks, mountains, rocks, etc. At block 804, the computing device may receive ammunition options. The ammunition options may include laser tag, MILES laser, bullet caliber, etc. At block 808, a fall delay selection may be received. The process 800 ends at block 810.

Figure 8B:
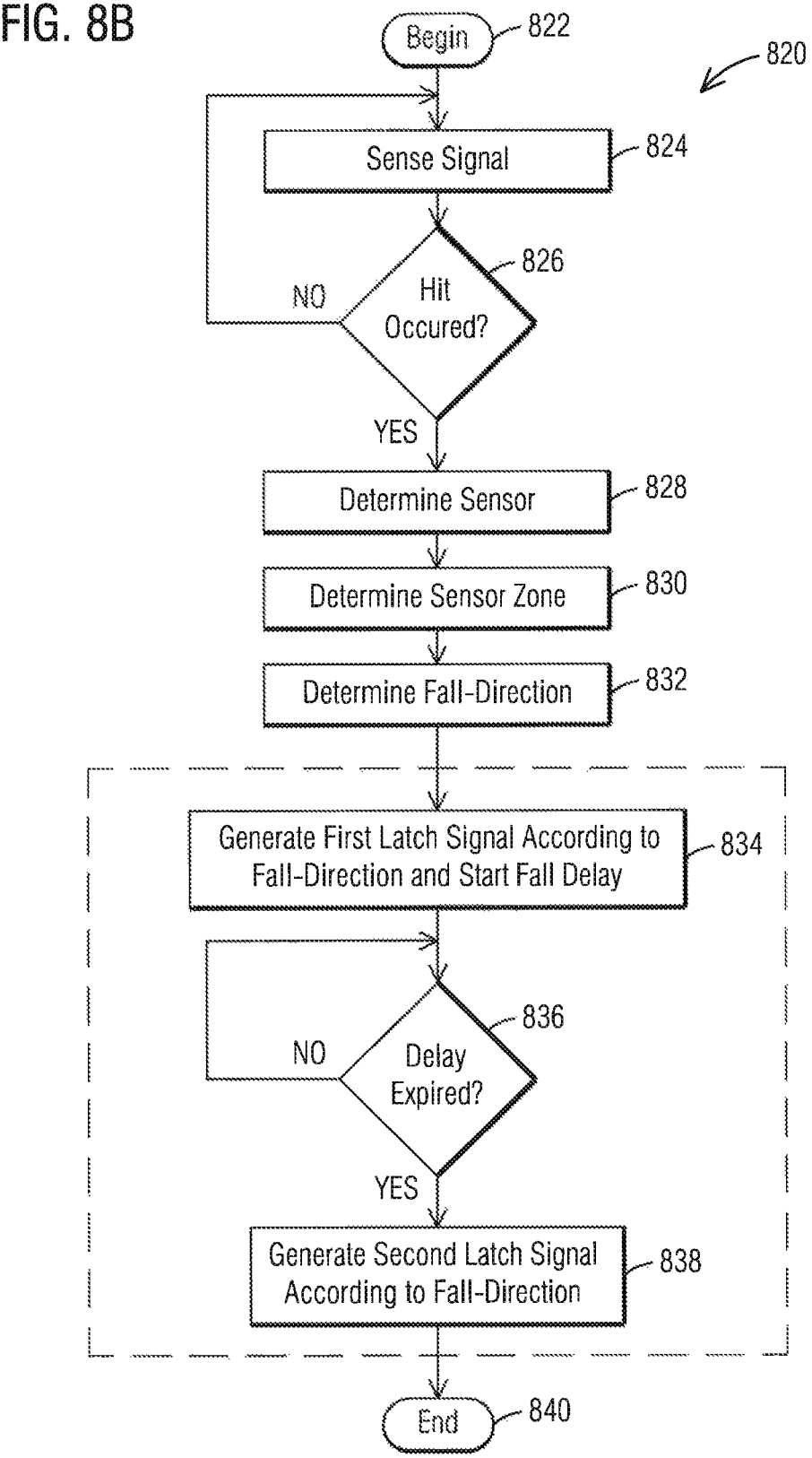
FIG. 8B illustrates a process for varying the fall-direction of a target.

FIG. 8B illustrates a process 820 for varying the fall-direction of a target (i.e., mannequin 110). The process 820 begins at block 822. At block 824, a signal is sensed. At block 826, a determination is made whether a hit occurred. If the determination is "NO," the process 800 may loop back to keep waiting to sense a signal. If the determination is "YES," meaning a hit has occurred, then at block 828, the process determined which sensor sent the hit indicating signal or the sensor sending a signal with the highest amplitude to denote impact location. By way of non-limiting example, the sensor may be determined by a frequency at which the sensor may communicate the sensed impact vibrations. At block 830, a sensor zone may be determined. At block 832, a fall-direction may be determined.

At block 834, a first latch signal according to the fall direction is sent to the control platform. The first latch signal may cause the first latch to release a first pin. In an embodiment, at block, 834, a fall delay timing may be started. At block 836, a determination is made whether the delay has expired. If the determination is "NO," the process loops to wait for the delay timing to expire. If the determination is "YES," then a second latch signal according to the fall-direction is generated. The second latch signal may cause the second latch to release the second pin.

Block 834, 836 and 838 are shown in a dashed box which represents steps for carrying out a fall-direction sequence for a left fall-direction or a right fall-direction. For example, for a left fall-direction, the first latch may be latch 137B in FIG. 1B and the first pin corresponds to latching pin 155B. The second latch may be latch 137A and the second pin corresponds to latching pin 155A.

For a right fall-direction, the first latch may be latch 137A in FIG. 1C and the first pin corresponds to latching pin 155A. The second latch may be latch 137B and the second pin corresponds to latching pin 155B. In general, for a left fall-direction, the first latch may be the left latch and the first pin may be the left pin. For a right fall-direction, the first latch may be the right latch and the first pin may be the right pin.

When the fall-direction sequence is a forward direction, block 836 is omitted and blocks 834 and 838 are performed essentially simultaneously. The process 820 may end at block 840.

In an embodiment, the fall-direction sequence may include a stumble (first rotation in the fall-direction) by the release of a first latching pin followed by a complete fall in the fall-direction upon release of the second latching pin.

Different states of system 100A will now be described. The system reference numeral may change to 100B, 100C and 100D for the different states corresponding to the latching operation. However, the system remains the same.

FIG. 1B illustrates the fall-direction mannequin training system 100B in a second state. The second state corresponds to the rotation in the left direction. In the second state, the latch 137B is rotated to release latching pin 155B causing the mannequin 110 to rotate in a downward direction, under gravitational forces, on a left side of the mannequin about a latching pin 155A on the right side of the mannequin 110. The mannequin 110 may rotate to the left as the center of mass of the mannequin 110 is to the left of the axis of rotation (i.e., the axis of the latching pin 155A).

In an embodiment, the left fall-direction includes the mannequin 110 first rotating in a left direction after the release of the left latching pin 155B. Then after a predetermined delay, the (right) latching pin 155A is released by (right) latch 137A causing under gravitational forces, the release of the first upper member 125 from the second upper member 142 such that the mannequin 110 falls in a left and downward direction. The first upright member 125 remains upright and supported by upright support member 150 and base 152.

FIG. 1C illustrates the fall-direction mannequin training system 100C in a third state. The third state corresponds to the rotation in the right direction. In the third state, the latch 137A is rotated to release latching pin 155A causing the mannequin 110 to rotate in a downward direction, under gravitational forces, on a right side of the mannequin about a latching pin 155B on the left side of the mannequin. The mannequin 110 may rotate to the right as the center of mass of the mannequin 110 is to the right of the axis of rotation (i.e., the axis of the latching pin 155B).

In an embodiment, the right fall-direction includes the mannequin 110 first rotating in a right direction after the release of the right latching pin 155A. Then after a predetermined delay, the (left) latching pin 155B is released by (left) latch 137B causing under gravitational forces, the release of the first upper member 125 from the second upper member 142 such that the mannequin 110 falls in a right and downward direction. The first upright member 125 remains upright and supported by upright support member 150 and base 152.

When the control platform 120 produces a right or left fall-direction, one of the latches according to the fall-direction is first released followed by a predetermined delay for the subsequent release of the remaining latch. In an embodiment, the delay may be a 770 ms delay. A delay may give the target a more human-like reaction. In an embodiment, the delay may be from 0 to 3 seconds and may be varied. In an embodiment, the delay may be varied based on the weight of the mannequin or target.

FIG. 1D illustrates the fall-direction mannequin training system 100D in a fourth state. The fourth state corresponds to the rotation of both latches 137A and 137B simultaneously to release latching pins 155A and 155B simultaneously. In the fourth state, upon release of both pins 155A and 155B, the first and second upper members 125 and 142 separate from each other. Then, under gravitational forces acting on the second upper member 142, the second upper member 142 supporting the mannequin 110 falls straight downward or forward. The first upper member 125 remains upright supported by upright support member 150 and base 152.

The fourth state (release of both latching pins) allows the mannequin to be removed for transport. The rotatable joints of the mannequin 110 allow the mannequin to be folded up, as desired. For example, the legs 108A and 108B may be rotated over the torso 102.

By using two electronically-controlled latches 137A and 137B, the control platform 120 may be configured to control the direction of fall of the mannequin. These latches 137A and 137B may be normally mechanically latched closed or locked state. Without power, the latches may stay in a locked state so the mannequin does not collapse upon power down of the system 100A. Upon activation, by the computing device 170, the latches 137A and 137B may be released in a timed sequence. When the control platform 120 produces a forward fall-direction, the mannequin may fall straight down toward the ground or floor. The forward fall-direction may be accomplished by simultaneous release of both latches.

The military has a training need to use realistic targets in urban operations training that fall in the expected direction based on the location of the bullet strike. The system 100A may be configured to control the mannequin 110 (i.e., target) to fall in a realistic fashion to simulate reaction to a gunshot wound such as in a real-world environment. In operation, upon the mannequin 110 being hit with a bullet, ammunition, paintball or laser, the fall-direction control platform 120 may cause the mannequin 110 (i.e., target) to collapse in a randomly selected fall-direction. The control platform 120 and/or mannequin 110 may be configured to withstand or be concealed from gunfire to avoid damage. In an embodiment, upon collapsing, the mannequin 110 may be configured to fall in a direction that does not interfere with the trainee's weapons. Hence, a fall-direction option may be omitted to prevent the fall of the mannequin 110 from interfering with the trainee and the trainee's weapon.

The system 100A may be configured to be portable from room to room to set up various training scenarios.

While, the system 100A detects the zone, the fall-direction may sometimes be a function of the zone. Nonetheless, the system 100A may also randomly select the fall-direction so that the mannequin dies differently which may add a level of uncertainty. The random selection of the fall-direction may minimize learned responses to simulated acts of an enemy, such as the target always falling in the same direction when hit by ammunition.

For example, during training, soldiers may train in a shoothouse 100 times. Thus, the soldier may become familiar with the behaviors of the simulated enemy such as how they die. As the soldier becomes familiar, these memories may be stored creating some sort of memory association with that behavior, which creates a level of confidence. However, this is not true to real life. By randomizing the fall-direction, memorizing the patterns may be more difficult.

Figure 7:
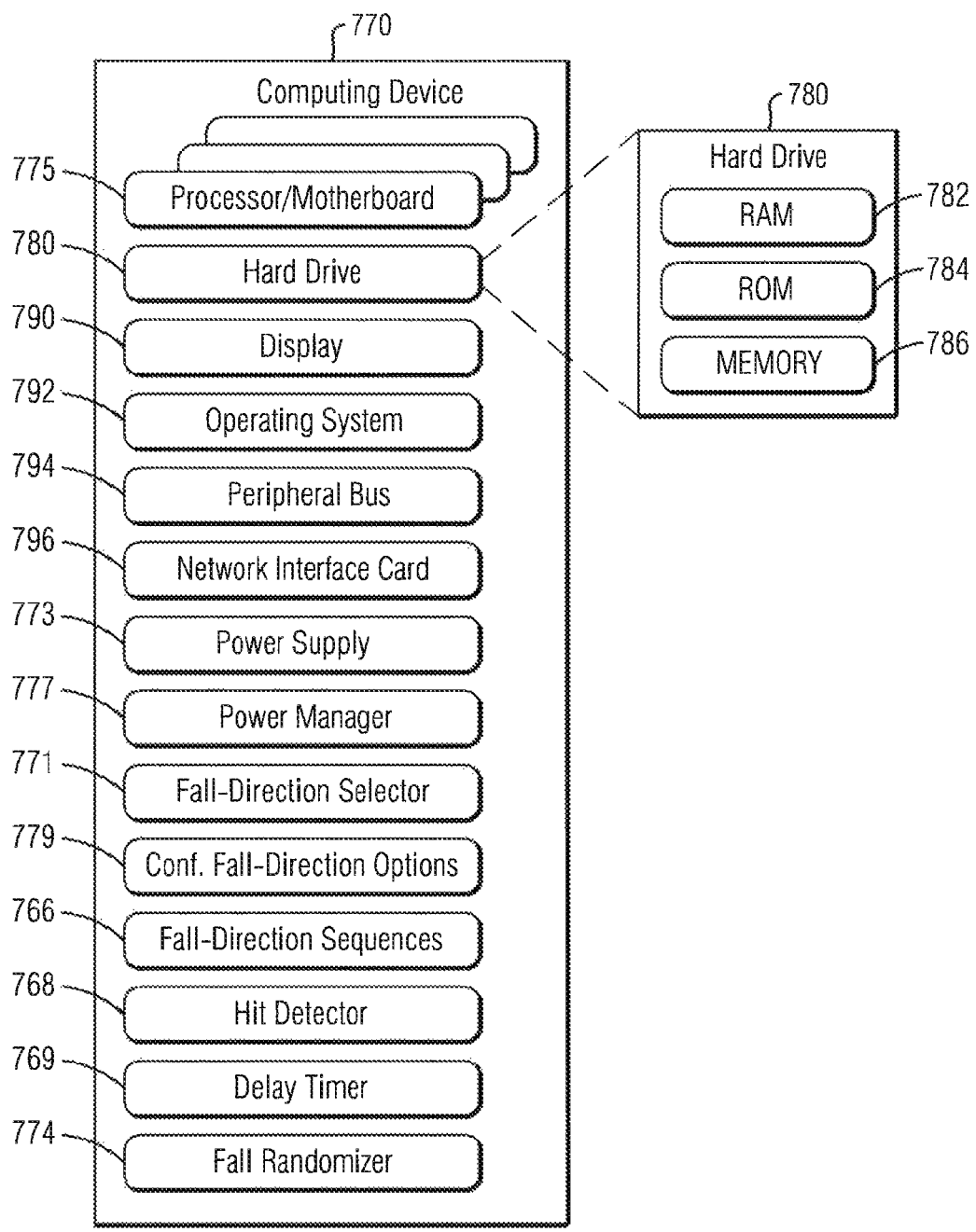
FIG. 7 illustrates a block diagram of a computing device.

Referring now to FIG. 7, in a basic configuration, the computing device 770 may include any type of stationary computing device or a mobile computing device. Computing device 770 may include one or more processors 775 and system memory in hard drive 780. Depending on the exact configuration and type of computing device, system memory may be volatile (such as RAM 782), non-volatile (such as read only memory (ROM 784), flash memory 786, and the like) or some combination of the two. System memory may store operating system 792, one or more applications, and may include program data for performing processes 800 and 820. The computing device 770 may carry out one or more blocks of processes 800 and 820.

Computing device 770 may also have additional features or functionality. For example, computing device 770 may also include additional data storage devices (removable and/or non-removable) such as, for example, magnetic disks, optical disks, or tape. Computer storage media may include volatile and non-volatile, non-transitory, removable and non-removable media implemented in any method or technology for storage of data, such as computer readable instructions, data structures, program modules or other data. System memory, removable storage and non-removable storage are all examples of computer storage media. Computer storage media includes, but is not limited to, RAM, ROM, Electrically Erasable Read-Only Memory (EEPROM), flash memory or other memory technology, compact-disc-read-only memory (CD-ROM), digital versatile disks (DVD) or other optical storage, magnetic cassettes, magnetic tape, magnetic disk storage or other magnetic storage devices, or any other physical medium which can be used to store the desired data and which can be accessed by computing device. Any such computer storage media may be part of device.

Computing device 770 may also include or have interfaces for input device(s) (not shown) such as a keyboard, mouse, pen, voice input device, touch input device, etc. The computing device 770 may include or have interfaces for connection to output device(s) such as a display 790, speakers, etc. The computing device 770 may include a peripheral bus 794 for connecting to peripherals. Computing device 770 may contain communication connection(s) that allow the device to communicate with other computing devices, such as over a network or a wireless network. By way of example, and not limitation, communication connection(s) may include wired media such as a wired network or direct-wired connection, and wireless media such as acoustic, radio frequency (RF), infrared and other wireless media. The computing device 770 may include a network interface card 796 to connect (wired or wireless) to a network.

The computing device 770 may include a power supply 773 and power manager 777. The computing device 770 may include modules for fall-direction selector, configuration of fall-direction options 779, fall-direction sequences 766, fall randomizer 774, hit detector 768, and delay timer 769.

Computer program code for carrying out operations described above may be written in a variety of programming languages, including but not limited to a high-level programming language, such as C or C++, for development convenience. In addition, computer program code for carrying out operations of embodiments described herein may also be written in other programming languages, such as, but not limited to, interpreted languages. Some modules or routines may be written in assembly language or even micro-code to enhance performance and/or memory usage. It will be further appreciated that the functionality of any or all of the program modules may also be implemented using discrete hardware components, one or more application specific integrated circuits (ASICs), or a programmed Digital Signal Processor (DSP) or microcontroller. A code in which a program of the embodiments is described can be included as firmware in a RAM, a ROM and a flash memory. Otherwise, the code can be stored in a tangible computer-readable storage medium such as a magnetic tape, a flexible disc, a hard disc, a compact disc, a photo-magnetic disc, a digital versatile disc (DVD). The code may be stored in a non-transitory, tangible computer readable computer medium.

The embodiments may be configured for use in a computer or a data processing apparatus which includes a memory, such as a central processing unit (CPU), a RAM and a ROM as well as a storage medium such as a hard disc.

The "step-by-step process" for performing the claimed functions herein is a specific algorithm, and may be shown as a mathematical formula, in the text of the specification as prose, and/or in a flow chart. The instructions of the software program create a special purpose machine for carrying out the particular algorithm. Thus, in any means-plus-function claim herein in which the disclosed structure is a computer, or microprocessor, programmed to carry out an algorithm, the disclosed structure is not the general purpose computer, but rather the special purpose computer programmed to perform the disclosed algorithm.

A general purpose computer, or microprocessor, may be programmed to carry out the algorithm/steps for creating a new machine. The general purpose computer becomes a special purpose computer once it is programmed to perform particular functions pursuant to instructions from program software of the embodiments described herein. The instructions of the software program that carry out the algorithm/steps electrically change the general purpose computer by creating electrical paths within the device. These electrical paths create a special purpose machine for carrying out the particular algorithm/steps.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another.

Unless otherwise defined, all terms (including technical and scientific terms) used herein have the same meaning as commonly understood by one of ordinary skill in the art to which embodiments of the invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Therefore, the breadth and scope of the subject matter provided herein should not be limited by any of the above explicitly described embodiments. Rather, the scope of the embodiments should be defined in accordance with the following claims and their equivalents.

We claim:

1. A system comprising:
   a mannequin;
   a plurality of sensors coupled to the mannequin configured to generate at least one sensed signal;

first and second latching mechanisms independently controlled, each of the first and second latching mechanisms having a latched state and an unlatched state;

first and second pins providing an axis of rotation, the first pin being releasably coupled to the first latching mechanism and the second pin being releasably coupled to the second latching mechanism; and a computing device coupled to the plurality of sensors and the first and second latching mechanisms, the computing device to select a fall-direction from a plurality of different fall-direction options based on the at least one sensed signal and to cause the unlatching of the first latching mechanism to release the first pin or the second latching mechanism to release the second pin based on the selected fall-direction of the plurality of different fall-direction options.

2. The system of claim 1, wherein the computing device being configured to release the other latching mechanism after a predetermined delay.

3. The system of claim 1, wherein the fall-direction includes a right fall-direction or a left fall-direction; and wherein the first pin is a right pin and the first latching mechanism is a right latching mechanism when the fall-direction is a right fall-direction; and, alternately, the first pin is a left pin and the first latching mechanism is a left latching mechanism when the fall-direction is a left fall-direction.

4. The system of claim 3, wherein the selected fall-direction is selected randomly.

5. The system of claim 4, wherein options in the plurality of fall-direction options are configurable.

6. The system of claim 1, wherein when the computing device causes the unlatching of the first latching mechanism to release the first pin, simultaneously the computing device to cause the second latching mechanism to release the second pin based on the selected fall-direction being a forward fall-direction.

7. The system of claim 1, further comprising a fall-direction control platform, the fall-direction control platform includes:

a first part having the first and second latching mechanism, a first upper member supported by an upright support member and a base coupled to the upright support member; and a second part having a second upper member, the first and second pins coupled to the second upper member and a mannequin interface configured to couple the mannequin to the second part.

8. The system of claim 1, wherein the plurality of sensors includes a plurality of shock sensors, Multiple Integrated Laser Engagement System (MILES) sensors or a European laser tag standard.

9. A system comprising:

a mannequin;

a plurality of sensors coupled to the mannequin configured to generate at least one sensed signal;

a computing device coupled to the plurality of sensors and the first and second latching mechanisms, the computing device to select a fall-direction from a plurality of different fall-direction options based on the at least one sensed signal and to cause the unlatching of the first latching mechanism to release the first pin or the second latching mechanism to release the second pin based on the selected fall-direction of the plurality of different fall-direction options;

a fall-direction control platform including:

a first part comprising:

an upper member, a first latching mechanism coupled to the upper member on a first side;

a second latching mechanism coupled to the upper member on a second side, the second side being horizontally aligned with the first side;

an upright support member coupled to the upper member; and a base coupled to the upright support member; and a second part comprising:

a second upper member;

first and second latching pins coupled to the second upper member, the first and second latching pins being releasably coupleable to the first and second latching mechanism; and a mannequin interface configured to couple a mannequin to the second part; and communication interfaces to the first latching mechanism and the second latching mechanism, the communication interface to communicate control signals from the computing device to the first latching mechanism and the second latching mechanism based on a fall-direction sequence.

10. The system of claim 9, wherein the computing device is configured to be coupled to a plurality of sensors and the first and second latching mechanisms via the communication interfaces; and the computing device is configured to select the fall-direction sequence from a plurality of different fall-direction sequences based on at least one sensed signal from the plurality of sensors and to cause the unlatching of the first latching mechanism to release the first pin or the second latching mechanism to release the second pin based on the selected fall-direction sequence.

11. The system of claim 10, wherein the selected fall-direction sequence includes a right fall-direction sequence or a left fall-direction sequence; and wherein the first pin is a right pin and the first latching mechanism is a right latching mechanism when the fall-direction is a right fall-direction sequence; and, alternately, the first pin is a left pin and the first latching mechanism is a left latching mechanism when the fall-direction is a left fall-direction sequence.

12. The system of claim 10, wherein the selected fall-direction sequence is selected randomly.

13. The system of claim 10, wherein the plurality of fall-direction sequence are configurable.

14. The system of claim 10, wherein when the computing device causes the unlatching of the first latching mechanism to release the first pin, simultaneously the computing device to cause the second latching mechanism to release the second pin based on the selected fall-direction sequence being a forward fall-direction sequence.

15. A method comprising:

sensing, by a plurality of sensors, a parameter associated with a hit to a mannequin;

selecting, by a computing device, a fall-direction sequence from a plurality of fall-direction sequences when a hit is sensed by at least one sensor;

causing unlatching, by the computing device, of a first latching mechanism to release a first pin to cause the mannequin to begin to fall under gravitational forces in a direction associated with the selected fall-direction sequence;

causing unlatching, by the computing device, of a second latching mechanism to release a second pin to cause a fall of the mannequin in the direction of the fall-direction sequence;

independently controlling the first latching mechanism wherein the first latching mechanism has a latched state and an unlatched state;

independently controlling the second latching mechanism wherein the second latching mechanism has a latched state and an unlatched state;

providing an axis of rotation about the first pin, the first pin being releasably coupled to the first latching mechanism; and providing an axis of rotation about the second pin, the second pin being releasably coupled to the second latching mechanism.

16. The method of claim 15, wherein the selecting by the computing device includes randomly selecting by the computing device the fall-direction sequence from the plurality of fall-direction sequences.

17. The method of claim 15, wherein the causing of the unlatching of the first latching mechanism to release the first pin and the causing of the unlatching of the second latching mechanism to release the second pin occurs simultaneously based on the selected fall-direction sequence being a forward fall-direction sequence.

18. The method of claim 15, further comprising:

delaying the causing of the unlatching of the second latching mechanism by a predetermined delay; and wherein the causing of the unlatching of the first latching mechanism to release the first pin includes rotating the mannequin about an axis of rotation of the second pin under gravitational forces in the direction associated with the selected fall-direction sequence.

19. The method of claim 18, wherein the selected fall-direction sequence includes a right fall-direction sequence or a left fall-direction sequence; and wherein the first pin is a right pin and the first latching mechanism is a right latching mechanism when the fall-direction sequence is a right fall-direction sequence; and, alternately, the first pin is a left pin and the first latching mechanism is a left latching mechanism when the fall-direction sequence is a left fall-direction sequence.

* * * * *